United States Patent [19]

Dany

[11] 4,339,179

[45] Jul. 13, 1982

[54] EYEGLASS FRAME HAVING OPEN RIMS CLOSED BY SELF-LOCKING SCREW ASSEMBLIES WITH DOG CLUTCH MEANS

[75] Inventor: Jean Dany, Bar-le-Duc, France

[73] Assignee: Essilor International "Cie Generale d'Optique", Creteil, France

[21] Appl. No.: 151,578

[22] Filed: May 20, 1980

[30] Foreign Application Priority Data

May 22, 1979 [FR] France ................................ 79 12942

[51] Int. Cl.³ .......................... G02C 5/22; G02C 1/08
[52] U.S. Cl. ........................................ 351/153; 351/90
[58] Field of Search ........................ 351/153, 154, 90; 16/128 A; 411/141, 187, 188

[56] References Cited

U.S. PATENT DOCUMENTS

| | | | |
|---|---|---|---|
| 1,576,870 | 3/1926 | Stevens et al. | 351/153 X |
| 2,037,586 | 4/1936 | Olson | 411/187 |
| 3,438,416 | 4/1969 | Thurston | 151/37 |
| 3,802,475 | 4/1974 | Gerlach | 151/39 |

FOREIGN PATENT DOCUMENTS 1595149 7/1970 France .
2204816 10/1973 France .

Primary Examiner—John K. Corbin
Assistant Examiner—Rodney B. Bovernick
Attorney, Agent, or Firm—Charles E. Brown

[57] ABSTRACT

An eyeglass frame having open ended rims closed by screw assemblies for clamping lenses therein is disclosed. Each screw assembly comprises a machine screw having a head which defines a bearing surface, a nut threadedly engageable with the threaded shank of the screw, and integrally formed with a lug at one end of the open rim, and an insert member integrally formed with a lug at the other end of the open rim and having a cooperable bearing surface. Dog clutches are formed on the bearing surfaces and preferably comprise alternating projecting portions and recesses in an annular array. The dog clutches normally prevent loosening of the screw assembly by limiting the degree of relative angular displacement between the bearing surfaces, but the gap between the lugs and the resilience of the rims permits unscrewing of the assembly to remove the lens without damaging any of the parts of the assembly.

14 Claims, 4 Drawing Figures

EYEGLASS FRAME HAVING OPEN RIMS CLOSED BY SELF-LOCKING SCREW ASSEMBLIES WITH DOG CLUTCH MEANS

FIELD OF THE INVENTION

The present invention relates generally to eyeglass frames, and more particularly to screw assemblies for closing the open ends of the rims for clamping lenses of the eyeglasses therein.

BACKGROUND OF THE INVENTION

In such eyeglass frames one end of one of the open rims forms the nut of the assembly and the other end of the rim forms an insert which is freely traversed by the shank of the screw itself.

The underside of the machine screw and the insert together define transverse bearing surfaces. The bearing surfaces are urged together for clamping the rims around the corresponding lenses.

The insert member is fixed against rotation relative to the nut member since it is part of the same rim as the nut but is axially displaceable relative to the nut against the biassing means which tend to keep the insert away from the nut and which are defined by the inherent resilience of the rim itself. The base transverse bearing surface formed on the insert engages the transverse bearing surface formed on the underside of the head of the screw. The biassing means tend to urge the lugs away from each other.

One of the problems posed with the holding of such screw assemblies of eyeglass frames is to assure long-lasting clamping necessary to prevent accidental loss of lenses while permitting, whenever necessary, the removal of lenses for their replacement.

It is of course well known at the present to provide such screw assemblies with self-locking means thereby satisfying the first-mentioned requirement. But any disassembly of such machine screw assemblies with self-locking means has meant damaging one of the component parts of the assembly which must then be repaired or even replaced if subsequent reassembly is desired.

Such is the case, for example, with the arrangement disclosed in French printed patent application No. 2,204,816 in which it is proposed to locally flange part of the insert member against the screw which extends therethrough, the insert member forming for this purpose an annular member around the head of the screw.

Further, in some arrangements an additional part of the nut locking variety must frequently be used thereby complicating the steps of assembly, disassembly and reassembly and increasing the cost of such a screw assembly.

This is the case with U.S. Pat. No. 3,438,416, for example, in which waved surfaces are provided on the underside of the screw and the washer, the washer being initially free for rotation in relation to the nut with which the screw must threadedly engage. Moreover, this screw assembly is not intended to be used for closing the open end of an eyeglass frame rim.

SUMMARY OF THE INVENTION

An object of the invention is to provide an eyeglass frame having a rim the open end of which is closed by a screw assembly which is advantageously self-locking and disassemblable and reassemblable in its entirety.

According to the invention there is provided an eyeglass frame part comprising at least one open rim for receiving a lens, superposed lugs being formed at the open ends of said rim, said rim being of resilient construction and biassing said lugs away from each other so as to define a gap constantly therebetween, and a screw assembly for closing said open rim and clamping a lens therein, including a machine screw having a head and a threaded shank, a nut member threaddedly engageable with said threaded shank, and an insert member interposed between said head of said machine screw and said nut member, the underside of said head and said insert member defining cooperable transverse bearing surfaces, cooperable dog clutch means formed on said bearing surfaces, said nut member being formed on one of said lugs and said insert member being formed on the other of said lugs.

In practice the dog clutch means comprise at least one projection portion or boss on one of the transverse bearing surfaces at least partially engageable with play with at least one recess in the other transverse bearing surface.

Thus, taking into account the fact that the rim of the eyeglass frame comprises an open ring, advantage is taken of the "elastic play" between the transverse bearing surfaces for employing the dog clutch means for permitting non-rotational coupling of the transverse bearing surfaces.

Whereupon, owing to the dog clutch means, when the screw of the screw assembly has the tendency to loosen the transverse bearing surfaces of the assembly come into engagement for at least a portion of their relative angular movement, applying an axial resistance greater than the axial loosening of unscrewing force of the screw so that effective independent loosening or unscrewing of the screw is precluded.

To unscrew the screw a tool must be used, such as a socket screw key or a screwdriver, adapted to apply sufficient torque to the screw to overcome the resistance due to the dog clutch means. Such unscrewing does not cause any damage to the transverse bearing surfaces so that the screw assembly according to the invention may be disassembled and reused even though it is self-locking in operation.

The present screw assembly of the invention has other advantages.

First, it may be used in cramped conditions for, all things being equal, the screw assembly of the invention is of substantially the same dimensions as comparable conventional screw assemblies. This is particularly so since it advantageously does not employ any additional parts over that of conventional screw assemblies.

Further, the screw assembly of the present invention defines torque limiting means. Starting from the moment the unscrewing torque is too small to overcome the resistance due to the dog clutch means, the unscrewing action may be stopped and the self-locking action is then assured without it being necessary to increase the screwing torque. Consequently the chance of rupture due to excessive traction on the screw is advantageously diminished.

BRIEF DESCRIPTION OF THE DRAWINGS

These and other advantages of the invention will be brought out in the description which follows, given by way of example, with reference to the accompanying drawings.

DETAILED DESCRIPTION OF THE PREFERRED EMBODIMENT

Figure 1:
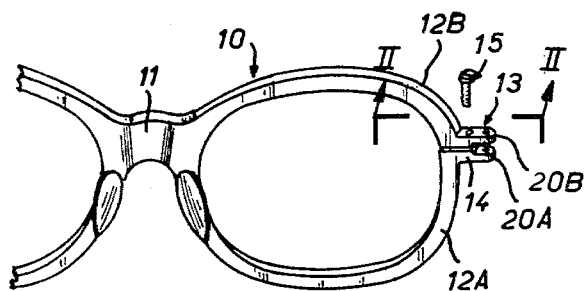
FIG. 1 is a fragmentary perspective view of an eyeglass frame having at least one rim provided with a screw assembly embodying the invention.

In the drawings will be recognized an eyeglass frame, preferably of metal construction, comprising two rims 10 connected to each other by a nose bridge 11 and adapted to receive eyeglass lenses, not shown. For this purpose the rims 10 form rings which are open at their outer ends 12A, 12B for which screw assemblies 13 are provided.

Generally speaking, such a screw assembly comprises a machine screw 15 and a nut member 14, the head 16 of the machine screw 15 having on its underside a transverse bearing surface 17 adapted to engage a transverse bearing surface 18 fixed against rotation relative to the nut member 14.

As illustrated, the nut member 14 is integrally formed with the lug 20A laterally extending from the end 12A of the rim 10. Between the nut member 14 and the machine screw 15 is an insert member which, as illustrated, is integrally formed with a lug 20B projecting laterally from the other end 12B of the rim 10 in alignment with lug 20A.

In the illustrated embodiment the lugs 20A, 20B together define a yoke adapted to pivotally mount a bow or temple (not shown) of the eyeglass frame.

Alternatively, as is known per se, the pivotal mounting may be by means of a yoke integral with only one of the lugs 20A or 20B or more precisely one of the ends 12A or 12B of the particular rim. In any event the lug 20B has along the axis of tapped bore 21 of the nut member 14 a passageway 22 by which it is adapted to be freely traversed by the unthreaded portion of the shank 23 of the machine screw 15.

As the lug 20B is carried by the same part as the nut member 14, namely, the rim 10, it is fixed against rotation relative to the nut member 16. Nonetheless, the lug 20B is axially displaceable in relation to the nut member 14 for closing the ring formed by the rim 10 around the eyeglass lens to be clamped in place. The relative axial displacement of the lugs 20A and 20B necessary for the closing of the ring is effected against the force of the resilient biassing means defined by the body of the rim 10 which tend to move the lugs 20A and 20B away from each other but which in operation therefore tend to move the transverse bearing surfaces 17 and 18 toward each other.

In such a construction the transverse bearing surface 18 is formed on the insert member around the opening of the passageway 22 through the lug 20B adjacent the head 16 of the screw 15.

According to the invention dog clutch means are provided on the transverse bearing surfaces 17 and 18 and are adapted to come into engagement with each other.

Generally, the dog clutch means comprise at least one projecting portion or boss 24, projecting from either one of the transverse bearing surfaces, for example, the bearing surface 17 on the underside of the head 16 of the screw 15, and at least one recess 25 on the other transverse bearing surface 18 at least partially in engagement with the projecting portion or boss 24.

In the illustrated embodiment there are a plurality of recesses 25 and projecting portions or bosses 24 complementary with one another; both recesses and projecting portions are radially elongated and have axes of symmetry. The projecting portions or bosses 24 and the recesses 25 both define half-wave forms flaring from their radially inner periphery to their radially outer periphery. The transverse bearing surfaces 17 and 18 thus define a plurality of alternating regularly annularly distributed recesses and projecting portions. Thus the transverse bearing surface 17 on the underside of the head 16 of the screw 15 has alternating projecting portions 24 and recesses 25, and complementarily the base transverse bearing surface 18 has alternating recesses 25 and projecting portions or bosses 24.

Figure 3:
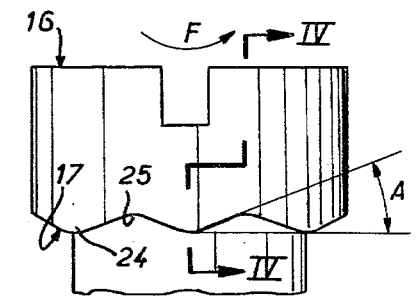
FIG. 3 is an elevational view on an even larger scale of the screw assembly.
Figure 2:
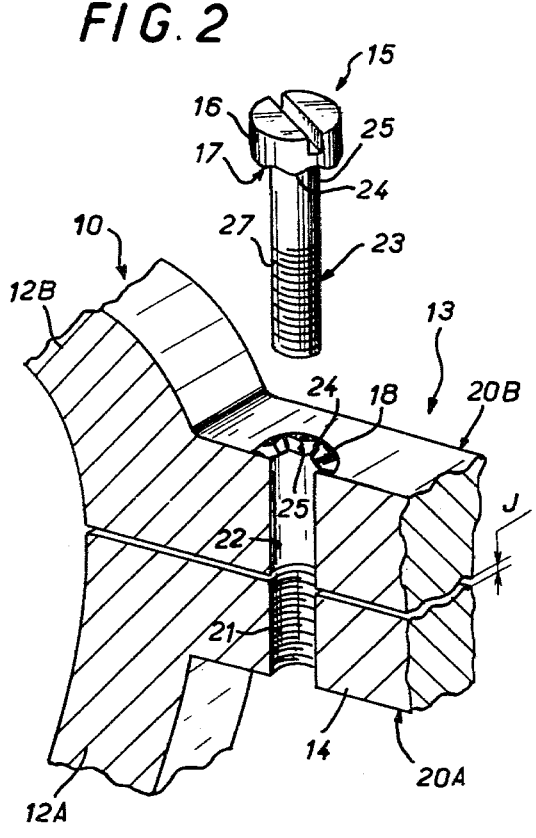
FIG. 2 is an enlarged cross-sectional view taken on line II—II in FIG. 1 of the machine screw assembly.
Figure 4:
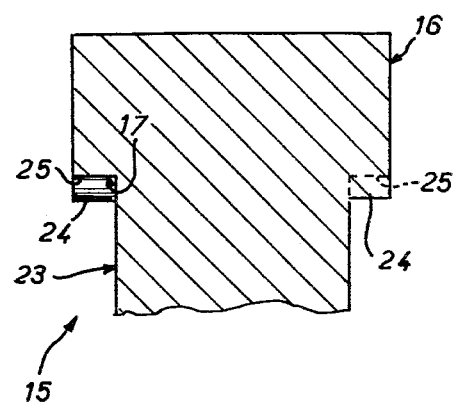
FIG. 4 is a fragmentary longitudinal sectional view of the machine screw taken on line IV—IV in FIG. 3.

Preferably, for the unscrewing direction of rotation of the screw 15 at least, as designated by arrow F in FIG. 3, the leading flanks of the projecting portions or bosses 24 and therefore the leading flanks of the recesses 25 have slopes A greater than the pitch B of the threads 27 of the screw.

As will be readily understood when the threaded shank 23 of the machine screw 15 is threadedly engaged with the tapped bore 21 in the nut member 14, after extending through the insert member formed in the lug 20B and screwed until its transverse bearing surface 17 comes into engagement with the transverse bearing surface 18 defined on lug 20B, each of the projecting portions 24 on the transverse bearing surface 17 on the underside of the head 16 of the screw 15 must clear in succession the projecting portions or bosses 24 on the base transverse bearing surface 18 as the screw is turned.

The clearing of the projecting portions or bosses 24 on the underside of the head 16 of the screw 15 over the base projecting portions or bosses 24 is only possible because of the axial elasticity or play afforded by the screw assembly by reason of the elasticity or resilience defined by the open rim 10 of the eyeglass frame and the gap J formed between the lugs 20A and 20B at the ends of upper and lower rim portions.

During the turning of the threaded fastener 15, the gap J varies between a minimum distance when the projecting portions or bosses 24 on the underside of head 16 of the screw 15 are in alignment with the projecting portions or bosses 24 on the lug 20B and a maximum distance when the projecting portions 24 on the underside of the head 16 of the screw 15 are in alignment with the recesses 25 on lug 20B.

When the clamping force applied between the lugs 20A and 20B at the ends of the upper and lower rim portions is sufficient the screwing movement of the screw 15 is arrested.

Whereupon, bearing in mind the relative values of the slope A and pitch B given above, any accidental or inadvertent loosening or unscrewing of the screw 15 is prevented. However, the screw 15 may be unscrewed without damaging any component parts of the screw assembly by applying sufficient torque to the head of the screw with an appropriate tool.

The transverse bearing surfaces with dog clutch means may be formed by any conventional mechanical method such as machining, die stamping or injection molding and the corresponding parts may be made of metal or synthetic material. Such bearing surfaces may not be integrally formed with their associated parts but formed on auxiliary parts suitably mounted on the former by welding, clipping or the like. In any event the surface quality of the bearing surfaces must be compatible with the sought-after results.

The present invention is moreover not limited to the illustrated and described embodiment but may encompass various expedients, and modifications without departing from the spirit and scope of the invention as defined by the appended claims. For instance, the number and/or configuration of the projecting portions or bosses and recesses defining the dog clutch means may be designed differently. Also, the number of projecting portions or bosses and/or recesses on the transverse bearing surface on the underside of the screw head may be different from that of the projecting portions or bosses and/or recesses on the corresponding base transverse bearing surface on the insert member.

In the limit case it suffices that a single boss be provided on one of the bearing surfaces and a single recess on the other bearing surface.

Furthermore, it is not essential that the entire surface of the projecting portion or portions intimately mate with its or their corresponding recess or recesses. It is sufficient that in the unscrewing or loosening direction the corresponding flanks of such bosses and recesses which alone define the effective surfaces thereof at least be in part complementary.

It is not essential, in contrast to the preferred embodiment, that each of the projecting portions or recesses be of symmetrical half-wave configuration in a circumferential array. On the contrary, the projecting portions and recesses may be circumferentially asymmetrical, the slope of their flanks in one direction being greater than the slope of their flanks in the opposite direction.

Likewise it is not essential that the projecting portions and recesses be radially elongated. On the contrary, the projecting portions and recesses may be of generally hemispherical configuration.

What is claimed is:

1. An eyeglass frame part comprising at least one open rim for receiving a lens, superposed lugs being formed at the open ends of said rim, said rim being of resilient construction and biassing said lugs away from each other so as to define a gap constantly therebetween and a screw assembly for bringing said lugs toward each other and clamping a lens in said rim, said screw assembly including a machine screw having a head and a threaded shank, a nut member threadedly engageable with said threaded shank, and an insert member interposed between said head of said machine screw and said nut member, the underside of said head and said insert member defining cooperable transverse bearing surfaces, cooperable dog clutch means formed on said bearing surfaces, said nut member being formed on one of said lugs and said insert member being formed on the other of said lugs whereby the biassing of said lugs away from each other tends to urge said cooperable dog clutch means into mutual engagement and the constant gap between said lugs insures resiliency of such mutual engagement.

2. The frame part according to claim 1, wherein said nut member and said insert member are respectively integrally formed with said one lug and said other lug.

3. The frame part according to claim 1 or 2, wherein said rim is of metal construction.

4. The frame part according to claim 1, wherein said dog clutch means comprises at least one projecting portion on one of said bearing surfaces and at least one cooperable recess on said other bearing surface at least partially engageable with said projecting portion.

5. The frame part according to claim 4, wherein said recess is of complementary configuration to said projecting member.

6. The frame part according to claim 4 or 5, wherein said projecting portion and said recess are radially elongated.

7. The frame part according to claim 4 or 5, wherein a leading flank of said projecting portion relative to the unscrewing direction of rotation of said machine screw and the corresponding flank of said recess have slopes greater than the pitch of the thread of said screw.

8. The frame part according to claim 4 or 5, there being a plurality of said projecting portions on said one bearing surface and a plurality of said recesses on said other bearing surface, said plurality of projecting portions and said plurality of recesses being in uniformly spaced annular arrays.

9. The frame part according to claim 8, there being a plurality of recesses alternating with said plurality of projecting portions on said one bearing surface and a plurality of projecting portions alternating with said plurality of recesses on said other bearing surface.

10. The frame part according to claim 8, wherein each of said projecting portions and each of said recesses are of symmetrical half-wave configuration.

11. The frame part according to claim 5, wherein said projecting portion and said recess are each of symmetrical half-wave configuration.

12. The frame part according to claim 1 or 4, wherein each of said bearing surfaces are of complementary configuration.

13. The frame part according to claim 8, wherein said bearing surfaces are of complementary configuration.

14. An eyeglass frame of the type comprising a face part having a pair of interconnected rims for receiving lenses, said rims defining open rims with superposed lugs extending from outer ends thereof, rims being of resilient construction and biassing said lugs away from each other to define a gap constantly therebetween, a screw assembly for bringing said lugs toward each other and clamping lenses in said rims, each said screw assembly comprising a machine screw having a head and a threaded shank, an insert member integrally formed with one of said lugs of the corresponding rim, and a nut member integrally formed with the other said lug of the corresponding rim, the underside of said head of said screw and said nut member defining cooperable transverse bearing surfaces, cooperable dog clutch means defined on said bearing surface, the bias of said lugs tending to urge said cooperable dog clutch means into mutual engagement, whereby once said screw is tightened said cooperable dog clutch means normally allows only very limited angular displacement between the said bearing surfaces, the gap between said lugs and resilience of the rim permitting said dog clutch means to override each other permitting disassembly when sufficient torque is applied to said screw.

* * * * *